United States Patent [19]

Choi

[11] Patent Number: 5,309,077
[45] Date of Patent: May 3, 1994

[54] APPARATUS AND METHOD FOR LOADING A CASSETTE TAPE IN A VIDEO EQUIPMENT

[75] Inventor: Joon H. Choi, Kyungki, Rep. of Korea

[73] Assignee: Gold Star Co., Ltd., Seoul, Rep. of Korea

[21] Appl. No.: 950,610

[22] Filed: Sep. 25, 1992

[30] Foreign Application Priority Data

Sep. 27, 1991 [KR] Rep. of Korea .............. 16932/1991

[51] Int. Cl.$^5$ ............................................. H02P 1/22
[52] U.S. Cl. ................................. 318/799; 318/599; 318/811; 388/819
[58] Field of Search .............. 318/599, 254, 439, 138, 318/432, 373, 799, 811, 804, 809, 805, 807; 388/819, 820, 811, 829, 915

[56] References Cited

U.S. PATENT DOCUMENTS

| | | | |
|---|---|---|---|
| 3,710,216 | 1/1973 | Smith | 318/373 |
| 4,605,887 | 8/1986 | Boella et al. | 318/432 |
| 4,893,067 | 1/1990 | Bhagwot et al. | 318/599 |
| 5,001,407 | 3/1991 | Suzuki et al. | 318/599 |

Primary Examiner—William M. Shoop, Jr.
Assistant Examiner—John W. Cabeca
Attorney, Agent, or Firm—Finnegan, Henderson, Farabow, Garrett & Dunner

[57] ABSTRACT

An apparatus and a method for loading a cassette tape in a video equipment, in which driving of a DC motor can be controlled according to an amount of load which is applied to the DC motor when the cassette tape is loaded. The apparatus include a rotation speed signal detecting circuit for detecting a signal corresponding to a rotation speed of the DC motor, an amplifying circuit for amplifying the detected rotation speed signal from the rotation speed signal detecting circuit by a predetermined amplification degree, a limiting circuit for inputting an output signal from the amplifying circuit and passing only signal components between predetermined maximum and minimum values, a comparison circuit for comparing an output signal from the limiting circuit with a predetermined reference signal and outputting a logic signal in accordance with the compared result, a reference signal generating circuit for feeding the predetermined reference signal to the comparison circuit, a PWM signal generating circuit for outputting a PWM signal of a desired duty ratio in accordance with the logic signal from the comparison circuit, and a smoothing circuit for smoothing the PWM signal from the PWM signal generating circuit and outputting the smoothed signal as a drive signal to the DC motor.

17 Claims, 6 Drawing Sheets

F I G. 6g
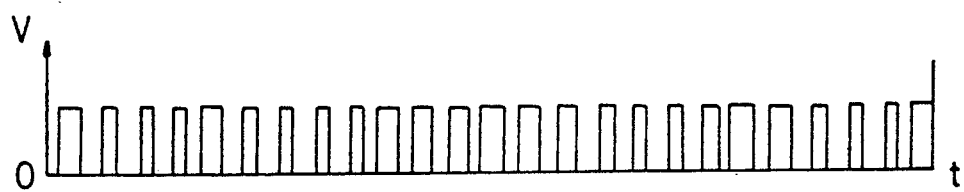
F I G. 6h
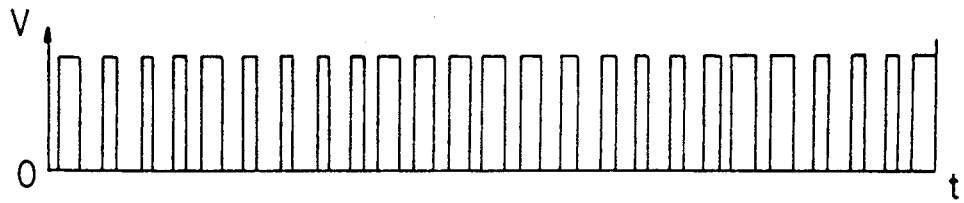
F I G. 6i
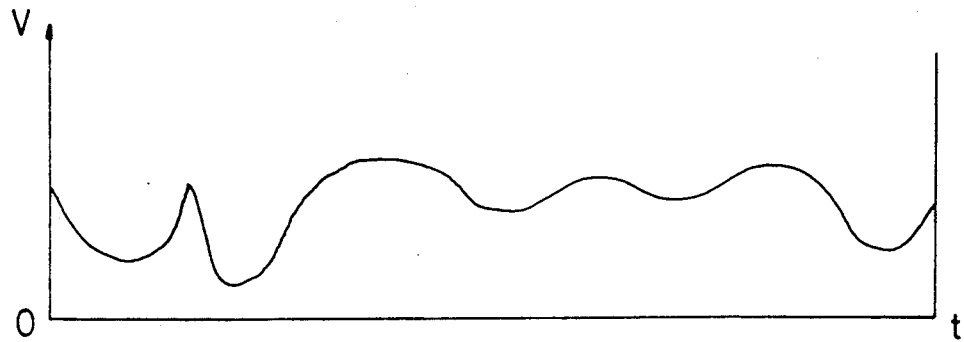

APPARATUS AND METHOD FOR LOADING A CASSETTE TAPE IN A VIDEO EQUIPMENT

BACKGROUND OF THE INVENTION

1. Field of the Invention

The present invention relates in general to a video equipment such as a video cassette tape (VCR), a camcorder and the like, and more particularly to an apparatus and a method for loading a cassette tape in a video equipment.

2. Description of the Prior Art

Conventionally, in a video equipment, a direct current (DC) motor is provided for the purpose of executing of an unloading operation of mounting a cassette tape into a cassette mechanism of the video equipment and a loading operation of bringing the unloaded cassette tape into contact with a head of the video equipment for recording and playback of a video signal.

The DC motor generally has two terminals for application of a drive voltage thereto and rotates in normal or reverse direction according to the alternation in polarities of the applied drive voltage. These rotations of the DC motor cause the loaded or unloaded cassette tape to be unloaded or loaded, respectively.

Referring to FIG. 1, a block diagram of a conventional apparatus is shown for loading a cassette tape in a video equipment. As shown in this figure, the conventional cassette tape loading apparatus comprises a DC motor 1, a microcomputer 2 for controlling the video equipment, a driver 3 for controlling a drive voltage to be applied to the DC motor 1 under the control of the microcomputer 2, and a switch 4 for detecting a mechanical rotation angle of the DC motor 1 to detect an actuated state of the DC motor 1 such as, for example, load completion, unload completion, eject, stop and etc.

The operation of the conventional cassette tape loading apparatus with the above-mentioned construction will hereinafter be described.

The microcomputer 2 recognizes the current state of the DC motor 1 through the switch 4 and, in response to an instruction from the user, outputs a control signal to the driver 3 to load or unload the cassette tape. In response to the control signal from the microcomputer 2, the driver 3 controls the drive voltage to be applied to the DC motor 1. As a result, the DC motor 1 may rotate in normal or reverse direction and, furthermore, the cassette tape may be loaded or unloaded.

Amount of load which is applied to the DC motor 1 in loading the cassette tape can be represented by a graph in FIG. 2. As seen from this figure, the load amount which is applied to the DC motor 1 in the operation of loading the cassette tape is severe in variation.

However, the conventional cassette tape loading apparatus has the following disadvantages.

Since the drive voltage applied to the DC motor 1 through the driver 3 is constant in level until completion of the loading operation as shown in FIG. 3, the DC motor 1 rotates at a constant speed until completion of the loading operation. For this reason, in a case where the cassette tape is tightly wound, the rotation of the DC motor 1 is made at a relatively fast speed, resulting in a severe pull at the cassette tape. This severe pull at the cassette tape damages the cassette tape such as by stretching the tape. On the other hand, in a case where the cassette tape is loosely wound, the rotation of the DC motor 1 is made at a relatively slow speed, resulting in the cassette tape being tangled. As a result, when the video equipment is used for a long time, the life of the DC motor and the cassette mechanism in the video equipment may be shortened as well as causing damage to the cassette tape. Also, since the DC motor is subject to an overload, power consumption may be wasted. Further, the rotation of the DC motor cannot be smooth due to such wound states. This causes noise in the DC motor.

SUMMARY OF THE INVENTION

The present invention has been made in view of the above problems, and it is an object of the present invention to provide an apparatus and a method for loading a cassette tape in a video equipment, wherein driving of a DC motor can be controlled according to an amount of load which is applied to the DC motor when the cassette tape is loaded.

In accordance with one aspect of the present invention, an apparatus is provided for loading a cassette tape in a video equipment, comprising: a DC motor for loading and unloading the cassette tape in the video equipment; rotation speed signal detecting means for detecting a signal corresponding to a rotation speed of the DC motor; amplifying means for amplifying the detected rotation speed signal from the rotation speed signal detecting means by a predetermined amplification degree; limiting means for inputting an output signal from the amplifying means and passing only signal components between predetermined maximum and minimum values; comparison means for comparing an output signal from the limiting means with a predetermined reference signal and outputting a logic signal in accordance with the compared result; reference signal generating means for feeding the predetermined reference signal to the comparison means; PWM (pulse width modulation) signal generating means for outputting a PWM signal of a desired duty ratio in accordance with the logic signal from the comparison means; and smoothing means for smoothing the PWM signal from the PWM signal generating means and outputting the smoothed signal as a drive signal to the DC motor.

In accordance with another aspect of the present invention, in a video equipment having a DC motor to load a cassette tape therein, a method of loading the cassette tape in the video equipment is provided, comprising the steps of: detecting a voltage corresponding to a rotation speed of the DC motor; comparing the detected voltage with a predetermined reference signal; generating a PWM signal of a desired duty ratio in accordance with the compared result; smoothing the generated PWM signal; and applying the smoothed PWM signal as a drive signal to the DC motor.

BRIEF DESCRIPTION OF THE DRAWINGS

The above and other objects, features and advantages of the present invention will be more clearly understood from the following detailed description taken in conjunction with the accompanying drawings, in which:

FIGS. 6A to 6I are waveform diagrams of signals from respective components in FIG. 5.

DETAILED DESCRIPTION OF THE PREFERRED EMBODIMENT

Figure 1:
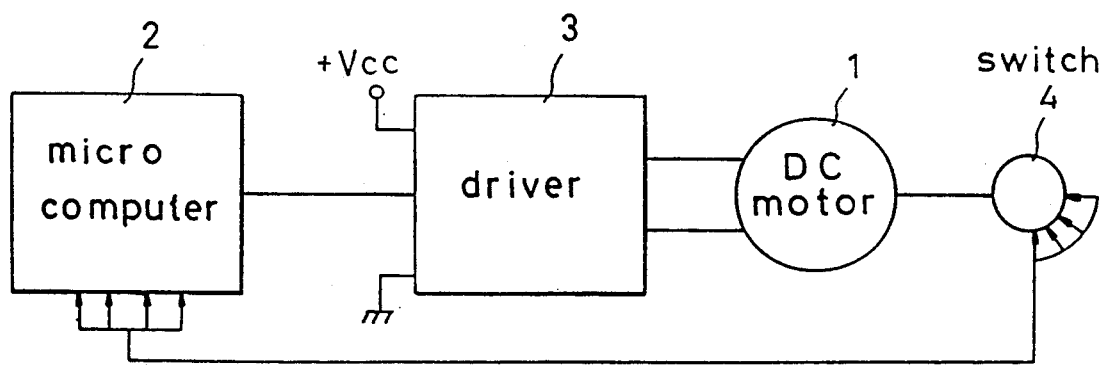
FIG. 1 is a block diagram of a conventional apparatus for loading a cassette tape in a video equipment.
Figure 2:
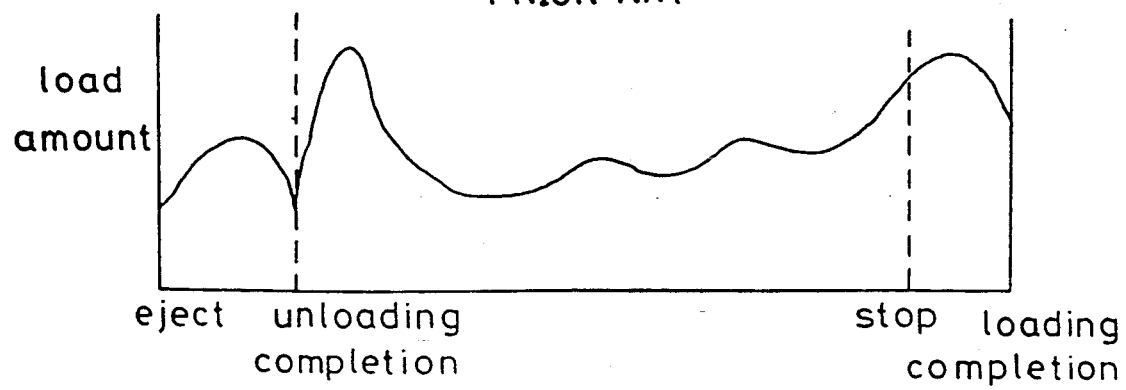
FIG. 2 is a graph illustrating an amount of load which is applied to a DC motor in the apparatus of FIG. 1 when the cassette tape is loaded in the video equipment.
Figure 3:
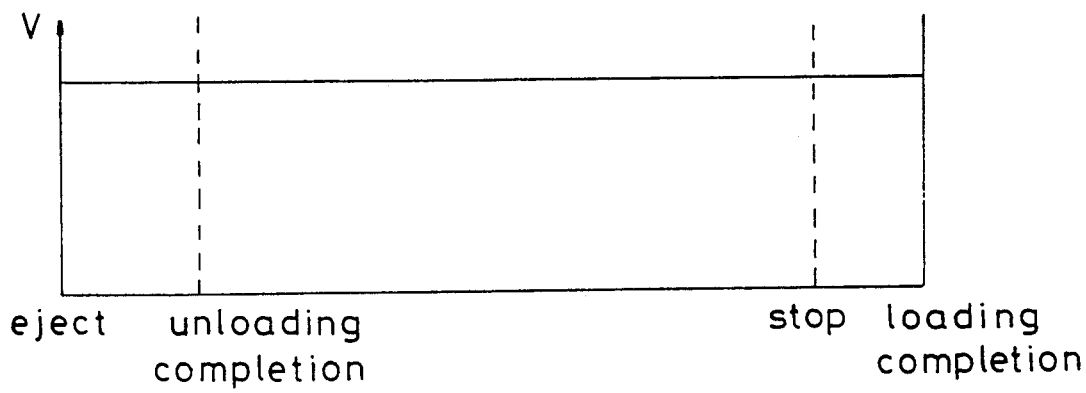
FIG. 3 is a graph illustrating a drive voltage which is applied to the DC motor in the apparatus of FIG. 1.
Figure 4:
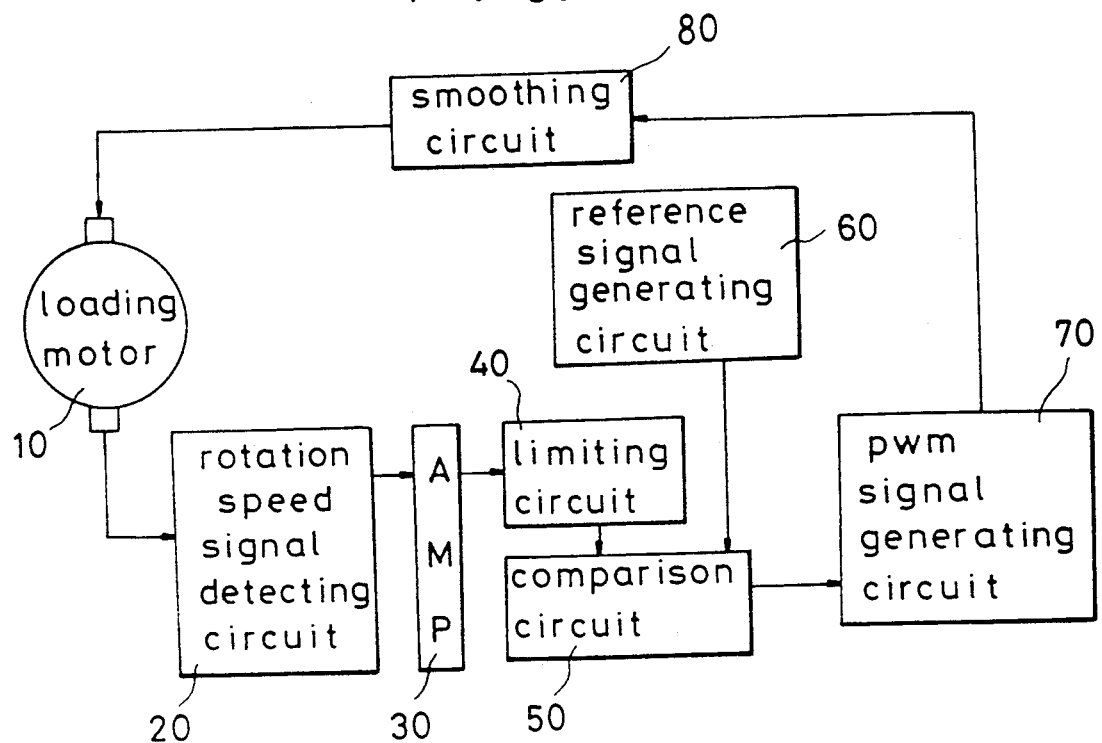
FIG. 4 is a block diagram of an apparatus for loading a cassette tape in a video equipment in accordance with the present invention.

Referring to FIG. 4, a block diagram of an apparatus is shown for loading a cassette tape in a video equipment in accordance with the present invention. As shown in this figure, the cassette tape loading apparatus of the present invention includes a loading motor 10 for loading and unloading the cassette tape in the video equipment such as a video cassette tape (VCR), a camcorder and the like, a rotation speed signal detecting circuit 20 for detecting a signal corresponding to a rotation speed of the loading motor 10, an amplifying circuit 30 for amplifying the detected rotation speed signal from the rotation speed signal detecting circuit 20 by a predetermined amplification degree, a limiting circuit 40 for inputting an output signal from the amplifying circuit 30 and passing only signal component between predetermined maximum and minimum values, a comparison circuit 50 for comparing an output signal from the limiting circuit 40 with a predetermined reference signal and outputting a logic signal in accordance with the compared result, a reference signal generating circuit 60 for feeding the predetermined reference signal to the comparison circuit 50, a pulse width modulation (PWM) signal generating circuit 70 for outputting a PWM signal of a desired duty ratio in accordance with the logic signal from the comparison circuit 50, and a smoothing circuit 80 for smoothing the PWM signal from the PWM signal generating circuit 70 and outputting the smoothed signal as a drive signal to the loading motor 10.

Figure 5:
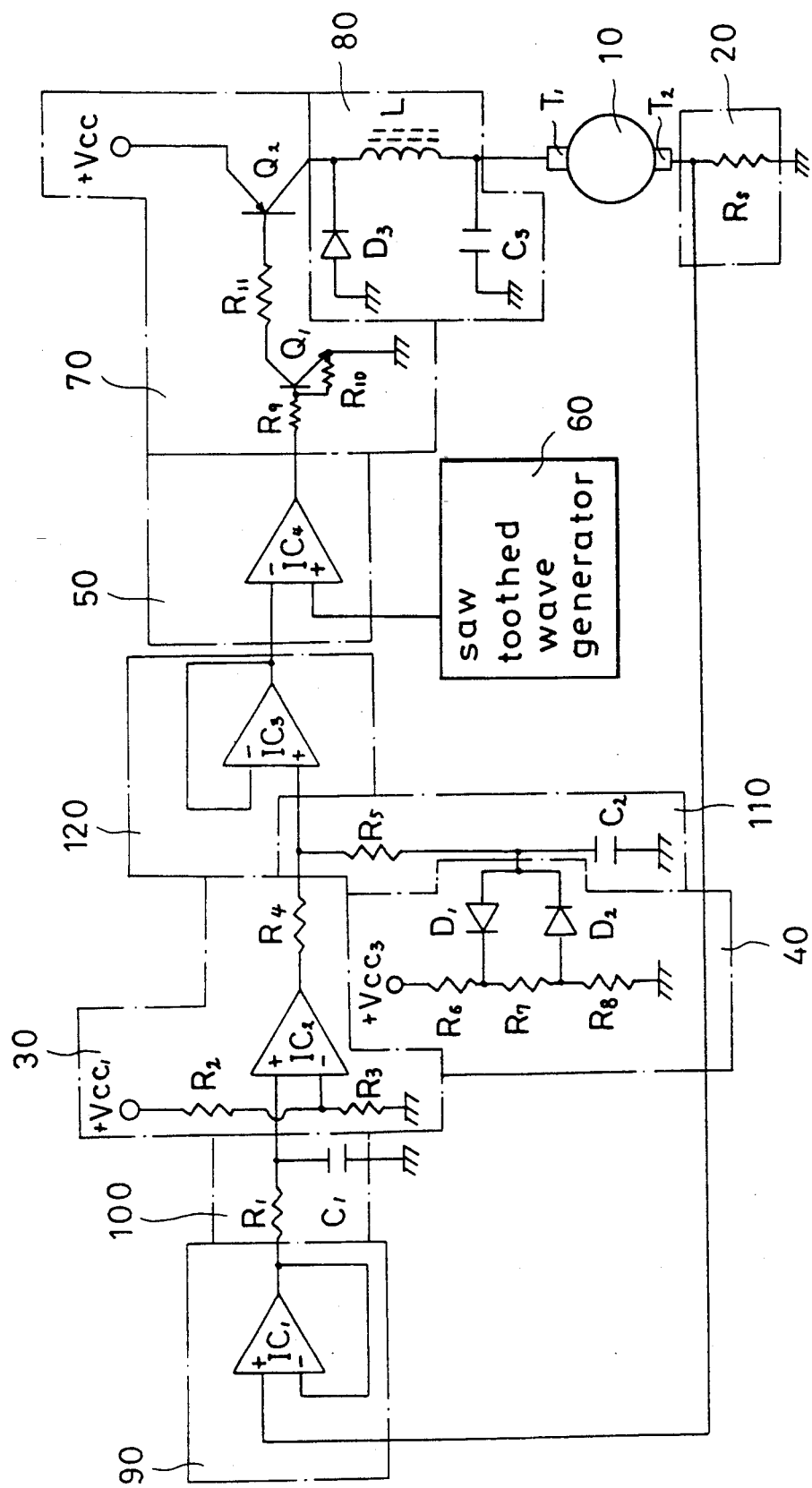
FIG. 5 is a detailed circuit diagram of the apparatus of FIG. 4.

Referring to FIG. 5, a detailed circuit diagram of the apparatus of FIG. 4 is shown. As shown in this drawing, the rotation speed signal detecting circuit 20 in FIG. 4 includes a resistor Rs connected between a ground and a terminal T2 of the loading motor 10 through which a current flows depending on the rotation speed of the loading motor 10.

The loading motor 10 may typically be a DC motor, which has two terminals (T1 and T2 in FIG. 5). If the amount of load which is applied to the DC motor is large, the DC motor rotates at a low speed and a counter electromotive force therein becomes low. As a result, much current flows through the two terminals of the DC motor. On the contrary, if the amount of load which is applied to the DC motor is small, little current flows through the two terminals of the DC motor. In this manner, when the current through the two terminals T1 and T2 of the loading motor 10 flows through the resistor Rs to the ground, voltage is detected across the resistor Rs depending on the rotation speed of the loading motor 10.

The amplifying circuit 30 in FIG. 4 includes a DC voltage source Vcc1, a bias resistor R2 and a gain setting resistor R3 connected in series between the DC voltage source Vcc1 and the ground, an operational amplifier IC2 having its non-inverting input terminal (+) for inputting the voltage corresponding to the rotation speed of the loading motor 10 and its inverting input terminal (−) connected between the bias resistor R2 and the gain setting resistor R3, and a resistor R4 connected to an output terminal of the operational amplifier IC2. As a result of the above-mentioned construction, the amplifying circuit 30 performs an analog amplification and, in this case, the operational amplifier IC2 has a gain of, typically, about 60dB or less.

The limiting circuit 40 in FIG. 4 includes a DC voltage source Vcc3, three resistors R6, R7 and R8 connected in series between the DC voltage source Vcc3 and the ground, a diode D1 having its cathode connected between the resistors R6 and R7 and its anode connected to the output of the amplifying circuit 30, and a diode D2 having its anode connected between the resistors R7 and R8 and its cathode connected to the output of the amplifying circuit 30.

The comparison circuit 50 in FIG. 4 includes an operational amplifier IC4 having its inverting input terminal (−) for receiving the output voltage from the limiting circuit 40 and its non-inverting input terminal (+) for receiving the reference signal from the reference signal generating circuit 60.

In accordance with the preferred embodiment of the present invention, the reference signal generating circuit 60 may be a sawtooth wave generating circuit.

The PWM signal generating circuit 70 in FIG. 4 includes a NPN type transistor Q1 having its base for receiving the output signal from the comparison circuit 50 and its emitter connected to the ground, a resistor R9 connected between the output of the comparison circuit 50 and the base of the NPN type transistor Q1, a resistor R10 connected between the base and the emitter of the NPN type transistor Q1, a DC voltage source Vcc, a PNP type transistor Q2 having its emitter connected to the DC voltage source Vcc, and a resistor R11 connected between a collector of the NPN type transistor Q1 and a base of the PNP type transistor Q2.

The smoothing circuit 80 in FIG. 4 includes a coil L connected between a collector of the PNP type transistor Q2 in the PWM signal generating circuit 70 and the first terminal T1 of the loading motor 10, a diode D3 having its cathode connected between the collector of the PNP type transistor Q2 and the coil L and its anode connected to the ground, and a capacitor C3 having its one side connected to the ground and its other side connected between the coil L and the first terminal T1 of the loading motor 10.

The cassette tape loading apparatus further includes a first buffering circuit 90 and a filtering circuit 100 connected between the rotation speed signal detecting circuit 20 and the amplifying circuit 30. The first buffering circuit 90 buffers the detected voltage corresponding to the rotation speed of the loading motor 10 and the filtering circuit 100 removes a noise component from an output signal from the first buffering circuit 90.

The first buffering circuit 90 includes an operational amplifier IC1 having its non-inverting input terminal (+) connected to the output of the rotation speed signal detecting circuit 20 and its inverting input terminal (−) connected to an output terminal of the operational amplifier IC1.

The filtering circuit 100 includes a resistor R1 having its one side connected to the output of the first buffering circuit 90 and its other side connected to the non-inverting input terminal (+) of the operational amplifier IC2 in the amplifying circuit 30, and a capacitor C1 having its one side connected between the resistor R1 and the non-inverting input terminal (+) of the operational amplifier IC2 and its other side connected to the ground. In accordance with the preferred embodiment of the present invention, the filtering circuit 100 may be a low-pass filter.

Also, the cassette tape loading apparatus further includes a stabilizing circuit 110 connected between the amplifying circuit 30 and the limiting circuit 40 for stabilizing the output signal from the amplifying circuit 30 against a sharp variation, and a second buffering circuit 120 connected between the limiting circuit 40 and the comparison circuit 50 for buffering the output signal from the limiting circuit 40.

The stabilizing circuit 110 includes a resistor R5 connected between the output of the amplifying circuit 30 and the input of the limiting circuit 40, and a capacitor C2 connected between the input of the limiting circuit 40 and the ground.

The second buffering circuit 120 includes an operational amplifier IC3 having its non-inverting input terminal (+) connected to the output of the limiting circuit 40 and its inverting input terminal (−) connected to an output terminal of the operational amplifier IC3.

Now, the operation of the construction in FIG. 5 will be described in detail with reference to FIGS. 6A to 6I which are waveform diagrams of the signals from the respective components in FIG. 5.

Figure 6A:
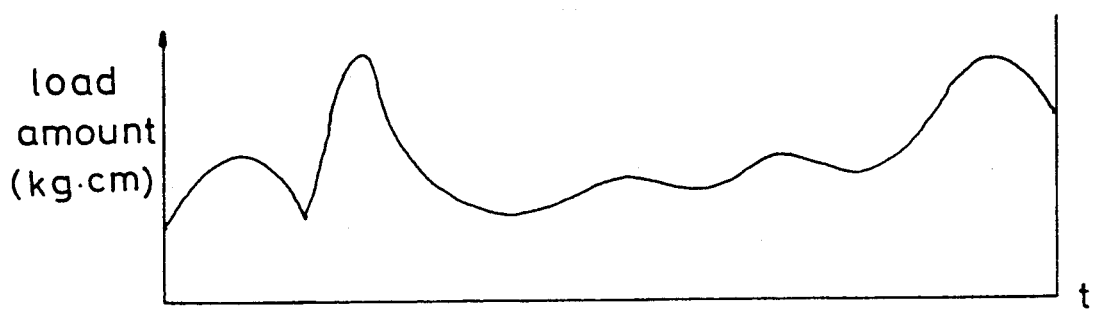

First, upon rotation of the loading motor 10 to load the cassette tape, the amount of load (Kg·cm) is typically produced on the loading motor 10 in the form of FIG. 6A. A voltage as shown in FIG. 6B is detected according to the load amount by the rotation speed signal detecting circuit 20 and applied to the first buffering circuit 90, which buffers the applied voltage.

Generally, as mentioned above, if the load which is applied to the loading motor 10 is large, the number of rotations of the loading motor 10 is small and much current flows through the terminals T1 and T2 of the loading motor 10. As a result, a voltage of higher level is detected in the rotation speed signal detecting circuit 20. On the contrary, if the load which is applied to the loading motor 10 is small; little current flows through the terminals T1 and T2 of the loading motor 10. As a result, a voltage of lower level is detected in the rotation speed signal detecting circuit 20.

Figure 6B:
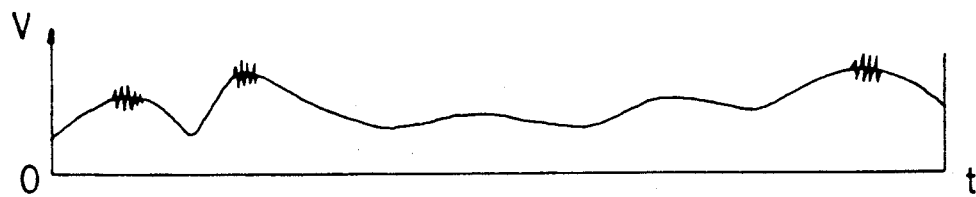
Figure 6C:
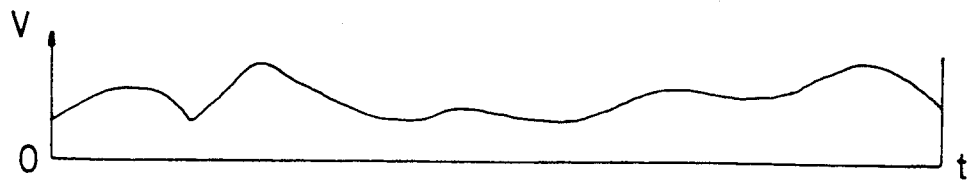

Since the detected voltage buffered in the first buffering circuit 90 contains a noise component as shown in FIG. 6B, it is low-pass filtered by the resistor R1 and the capacitor C1 in the filtering circuit 100 to remove the noise component. The detected voltage that is low-pass filtered in the filtering circuit 100 is analog-amplified by the amplifying circuit 30 and outputted therefrom as shown in FIG. 6C.

The operational amplifier IC2 in the amplifying circuit 30 has a desired gain which is determined by the bias resistor R2 and the gain setting resistor R3 (about 60dB or less) such that the operational amplifier IC2 can be used as an analog amplifier.

Figure 6D:
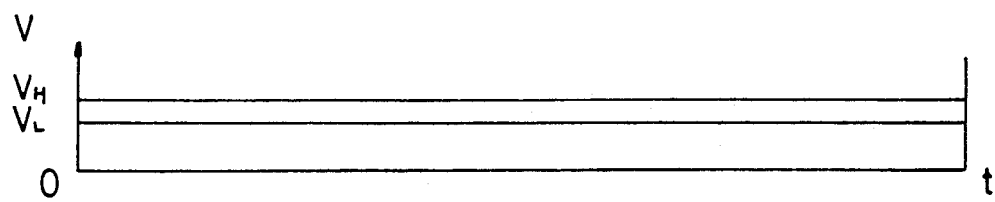
Figure 6E:
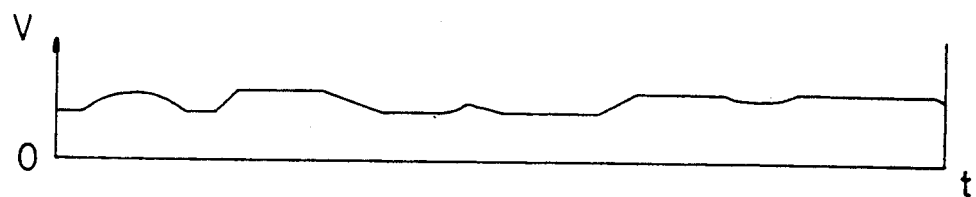

On the other hand, the limiting circuit 40 has the minimum voltage value $V_L$ and the maximum voltage value $V_H$, as shown in FIG. 6D, which are determined by the DC voltage source Vcc3 and the resistors R6 to R8. As a result, the voltage component from the amplifying circuit 30 above the maximum voltage value $V_H$ is removed by the diode D1 in the limiting circuit 40 and the voltage component from the amplifying circuit 30 below the minimum voltage value $V_L$ is removed by the diode D2 in the limiting circuit 40. Then, only voltage of component between the maximum voltage value $V_H$ and the minimum voltage value $V_L$ appears at the output of the limiting circuit 40 as shown in FIG. 6E.

Figure 6F:
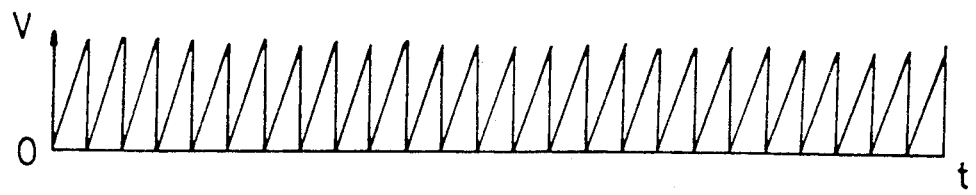

The output voltage from the amplifying circuit 30 limited by the limiting circuit 40 is buffered in the second buffering circuit 120 and applied to the inverting input terminal (−) of the operational amplifier IC4 in the comparison circuit 50. On the other hand, a sawtooth wave signal as shown in FIG. 6F oscillated from the reference signal generating circuit 60 as a sawtooth wave generating circuit is applied to the non-inverting input terminal (+) of the operational amplifier IC4 in the comparison circuit 50. As a result, the operational amplifier IC4 compares the signal as shown in FIG. 6E with the signal as shown in FIG. 6F and outputs a logic signal as shown in FIG. 6G in accordance with the compared result.

In the PWM signal generating circuit 70, the NPN type transistor Q1 is turned on or off in response to the output signal of high or low level from the comparison circuit 50 and the PNP type transistor Q2 is turned on or off in the opposite manner to that of NPN type transistor Q1. As a result, a PWM voltage appears at the collector of the PNP type transistor Q2 as shown in FIG. 6H. The PWM voltage is obtained by power-amplifying the DC voltage Vcc and has a desired duty ratio. For example, when the load on the loading motor 10 is reduced in amount, the PWM voltage has the duty ratio determined such that low level intervals of the PWM voltage are, overall more than high level intervals thereof. On the contrary, when the load on the loading motor 10 is increased in amount, the PWM voltage has the opposite duty ratio.

The PWM voltage is smoothed in the smoothing circuit 80 and applied as the drive voltage $V_M$ to the terminal T1 of the loading motor 10, with the waveform being shown in FIG. 6H. In other words, when the high level voltage appears at the collector of the PNP type transistor Q2 in the PWM signal generating circuit 70 by the turning-on of the PNP type transistor Q2, the high level voltage is applied to the loading motor 10 by the smoothing circuit 80 and, at the same time, is charged in the capacitor C3 in the smoothing circuit 80. Thereafter, when the voltage of low level appears at the collector of the PNP type transistor Q2 by the turning-off of the PNP type transistor Q2, the voltage charged in the capacitor C3 in the smoothing circuit 80 is discharged as the drive voltage $V_M$ to the loading motor 10. As a result, the voltage of the smoothed waveform as shown in FIG. 6I is applied as the drive voltage $V_M$ to the loading motor 10. It can be seen that the magnitude of the drive voltage $V_M$ shown in FIG. 6I is in inverse proportion to that of the load amount shown in FIG. 6A.

Therefore, in the case where the cassette tape is tightly wound resulting in application of much load amount to the loading motor 10, the level of the drive voltage $V_M$ applied through the smoothing circuit 80 to the loading motor 10 becomes lower than before. As a result, the loading motor 10 rotates slower than before. This has the effect of reducing tension on the cassette tape and preventing damage of the cassette tape such as by stretching the tape. Also, in the case where the cassette tape is loosely wound resulting in the application of too little load amount to the loading motor 10, the level of the drive voltage $V_M$ applied through the smoothing circuit 80 to the loading motor 10 becomes higher than before. As a result, the loading motor 10 rotates faster than before. This has the effect of allowing the cassette tape to be wound fast, thus, preventing the cassette tape from being tangled.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An apparatus for loading a cassette tape in video equipment, comprising:
    a DC motor for loading and unloading the cassette tape in the video equipment;
    rotation speed detecting means for detecting a voltage signal corresponding to a rotation speed of said DC motor;
    amplifying means for amplifying the detected voltage signal from said rotation speed detecting means by a predetermined amplification degree;
    limiting means for inputting an output signal from said amplifying means and passing only signal components between predetermined maximum and minimum values;
    reference signal generating means for generating a reference signal;
    comparison means for comparing an output signal from said limiting means with the reference signal and outputting a logical signal in accordance with the compared result;
    pulse width modulation (PWM) signal generating means for outputting a PWM signal of a desired duty ratio in accordance with the logic signal from said comparison means; and
    smoothing means for smoothing the PWM signal from said PWM signal generating means and outputting the smoothed signal as a drive signal to said DC motor to compensate for variations in tape windings of the cassette tape to prevent damage to the tape.

2. An apparatus for loading a cassette tape in video equipment according to claim 1, wherein said rotation speed detecting means includes a resistor connected between said DC motor and a ground.

3. An apparatus for loading a cassette tape in video equipment according to claim 1, wherein said amplifying means includes:
    a DC voltage source;
    a bias resistor having a first terminal connected to said DC voltage source;
    a gain setting resistor having a first terminal connected in series to a second terminal of said bias resistor and having a second terminal connected to a ground;
    an operational amplifier having a non-inverting input terminal for receiving the detected rotation speed signal from said rotation speed detecting means and an inverting input terminal connected between said bias resistor and said gain setting resistor; and
    a resistor connected to an output terminal of said operational amplifier.

4. An apparatus for loading a cassette tape in video equipment according to claim 1, wherein said limiting means includes:
    a DC voltage source;
    a first resistor having a first terminal connected to said DC voltage source;
    a second resistor having a first terminal connected to a second terminal of said first resistor;
    a third resistor having a first terminal connected to a second terminal of said second resistor and having a second terminal connected to a ground;
    a first diode having a cathode connected between said first and second resistors and an anode connected to the output of said amplifying means; and
    a second diode having an anode connected between said second and third resistors and a cathode connected to the output of said amplifying means.

5. An apparatus for loading a cassette tape in video equipment according to claim 1, wherein said comparison means includes an operational amplifier having an inverting input terminal for receiving the output signal from said limiting means and a non-inverting input terminal for receiving the reference signal from said reference signal generating means, said operational amplifier comparing the received two signals with each other and outputting the logic signal in accordance with the compared result.

6. An apparatus for loading a cassette tape in video equipment according to claim 1, wherein said reference signal generating means includes a sawtooth wave generating circuit for oscillating a sawtooth wave signal.

7. An apparatus for loading a cassette tape in video equipment according to claim 1, wherein said smoothing means includes:
    a coil having a first terminal connected to the output of said PWM signal generating means and a second terminal connected to one terminal of said DC motor;
    a diode having a cathode connected between the output of said PWM signal generating means and the first terminal of said coil and an anode connected to a ground; and
    a capacitor having a first terminal connected to the ground and a second terminal connected between the second terminal of said coil and the one terminal of said DC motor.

8. An apparatus for loading a cassette tape in video equipment according to claim 1, further comprising:
    means for buffering and filtering connected between said rotation speed detecting means and said amplifying means, said buffering means buffering the detected rotation speed signal from said rotation speed detecting means and said filtering means removing noise from an output signal from said buffering means.

9. An apparatus for loading a cassette tape in video equipment according to claim 8, wherein said buffering means includes an operational amplifier having a non-inverting input terminal for receiving the detected rotation speed signal from said rotation speed detecting means and an inverting input terminal connected to an output terminal of the operational amplifier.

10. An apparatus for loading a cassette tape in video equipment according to claim 8, wherein said filtering means includes a low-pass filter having a resistor connected at one terminal to a capacitor.

11. An apparatus for loading a cassette tape in video equipment according to claim 1, further comprising:
    stabilizing means connected between said amplifying means and said limiting means for stabilizing the output signal from said amplifying means against a sharp variation.

12. An apparatus for loading a cassette tape in video equipment according to claim 11, wherein said stabilizing means includes a resistor having a terminal connected to a capacitor.

13. An apparatus for loading a cassette tape in video equipment according to claim 1, further comprising:
   buffering means connected between said limiting means and said comparison means for buffering the output signal from said limiting means.

14. An apparatus for loading a cassette tape in video equipment according to claim 13, wherein said buffering means include an operational amplifier having a non-inverting input terminal for receiving the output signal from said limiting means and an inverting input terminal connected to an output terminal of the operational amplifier.

15. A method of loading a cassette tape in video equipment having a rotatable DC motor to load a cassette tape, the method comprising the steps of:
   detecting a voltage corresponding to a rotation speed of said DC motor;
   comparing said detected voltage with a predetermined reference signal;
   generating a pulse width modulation (PWM) signal of a desired duty ratio in accordance with the compared result;
   smoothing said generated PWM signal; and
   applying said smoothed PWM signal as a drive signal to said DC motor to compensate for variations in tape windings of the cassette tape to prevent damage to the tape.

16. The method according to claim 15, wherein said comparing step compares said detected voltage with an oscillating sawtooth wave signal.

17. An apparatus for loading a cassette tape in video equipment, comprising:
   a DC motor for loading and unloading the cassette tape in the video equipment;
   rotation speed detecting means for detecting a signal corresponding to a rotation speed of said DC motor;
   amplifying means for amplifying the detected rotation speed signal from said rotation speed detecting means by a predetermined amplification degree;
   limiting means for inputting an output signal from said amplifying means and passing only signal components between predetermined maximum and minimum values;
   reference signal generating means for generating a reference signal;
   comparison means for comparing an output signal from said limiting means with the reference signal and outputting a logical signal in accordance with the compared result;
   pulse width modulation (PWM) signal generating means for outputting a PWM signal of a desired duty ratio in accordance with the logic signal from said comparison means, said PWM signal generating means including an NPN type transistor having a base for receiving the output signal from said comparison means and an emitter connected to a ground, a first resistor connected between the output of said comparison means and said base of said NPN type transistor, a second resistor connected between said base and emitter of said NPN type transistor, a DC voltage source, a PNP type transistor having an emitter connected to said DC voltage source, and a third resistor connected between a collector of said NPN type transistor and a base of said PNP type transistor; and
   smoothing means for smoothing the PWM signal from said PWM signal generating means and outputting the smoothed signal as a drive signal to said DC motor.

* * * * *